US011176833B1

(12) United States Patent
McGaughy et al.

(10) Patent No.: US 11,176,833 B1
(45) Date of Patent: *Nov. 16, 2021

(54) FLIGHT MANAGEMENT SYSTEM AND FLIGHT PLAN ALERT INTEGRATION SYSTEMS AND METHODS

(71) Applicant: Rockwell Collins, Inc., Cedar Rapids, IA (US)

(72) Inventors: Ellen L. McGaughy, Cedar Rapids, IA (US); Bandi B. Reddy, Marion, IA (US); David L. Leedom, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/457,292

(22) Filed: Jun. 28, 2019

Related U.S. Application Data

(63) Continuation of application No. 15/258,860, filed on Sep. 7, 2016, now Pat. No. 10,339,817.

(51) Int. Cl.
*G08G 5/02* (2006.01)
*G08G 5/00* (2006.01)

(52) U.S. Cl.
CPC ......... *G08G 5/0039* (2013.01); *G08G 5/0021* (2013.01); *G08G 5/025* (2013.01)

(58) Field of Classification Search
None
See application file for complete search history.

(56) References Cited

U.S. PATENT DOCUMENTS

| 6,452,511 | B1 | 9/2002 | Kelly et al. | |
| 6,571,166 | B1* | 5/2003 | Johnson | G08G 5/0021 340/972 |
| 8,798,815 | B1* | 8/2014 | Burgin | B64D 45/00 701/9 |
| 9,858,823 | B1 | 1/2018 | Lynn et al. | |
| 2003/0206102 | A1 | 11/2003 | Joao | |

(Continued)

OTHER PUBLICATIONS

Non-Final Office Action for U.S. Appl. No. 15/258,860 dated Sep. 14, 2018. 12 pages.

(Continued)

*Primary Examiner* — Ryan Rink
(74) *Attorney, Agent, or Firm* — Suiter Swantz pc llo

(57) ABSTRACT

A flight management system includes a display for displaying a user interface and a processor coupled with the display and configured to receive flight plan information regarding a flight plan of an aircraft and aircraft status information from an aircraft monitoring system. The processor generates an alert indicating a deviation from the flight plan based on a comparison of the aircraft status information to the flight plan information, and provides the alert on a portion of the user interface displaying information indicative of the aircraft status information. The alert provides one or more user interface controls configured to enable a pilot to interact with the portion of the user interface displaying the information indicative of the aircraft status information to at least one of view additional information regarding the difference between the status information and the flight plan information and modify the flight plan of the aircraft.

20 Claims, 7 Drawing Sheets

(56) References Cited

U.S. PATENT DOCUMENTS

| | | |
|---|---|---|
| 2004/0111192 A1 | 6/2004 | Naimer et al. |
| 2005/0143871 A1 | 6/2005 | Boorman et al. |
| 2007/0236366 A1 | 10/2007 | Gur et al. |
| 2010/0030401 A1 | 2/2010 | Rogers et al. |
| 2011/0153212 A1 | 6/2011 | Brito et al. |
| 2012/0310450 A1 | 12/2012 | Srivastav et al. |
| 2014/0122070 A1* | 5/2014 | Prus .................. G08G 5/0021 704/235 |
| 2014/0350755 A1 | 11/2014 | Caillaud et al. |
| 2015/0143871 A1 | 5/2015 | Huang et al. |
| 2015/0145704 A1 | 5/2015 | Dahan |
| 2015/0262490 A1 | 9/2015 | Deker et al. |
| 2016/0057032 A1 | 2/2016 | Tieftrunk et al. |
| 2016/0217693 A1 | 7/2016 | Samuthirapandian et al. |
| 2018/0061243 A1 | 3/2018 | Shloosh |
| 2020/0168104 A1* | 5/2020 | Holder ................ G08G 5/0039 |

OTHER PUBLICATIONS

Notice of Allowance for U.S. Appl. No. 15/258,860 dated Feb. 21, 2019. 9 pages.

\* cited by examiner

FIG. 6

FLIGHT MANAGEMENT SYSTEM AND FLIGHT PLAN ALERT INTEGRATION SYSTEMS AND METHODS

CROSS-REFERENCE TO RELATED PATENT APPLICATIONS

This application is a continuation of U.S. patent application Ser. No. 15/258,860 filed Sep. 7, 2016, which is hereby incorporated by reference in its entirety.

BACKGROUND

The inventive concepts disclosed herein relate generally to flight displays for an aircraft. More particularly, embodiments of the inventive concepts disclosed herein relate to integrating an alerting system or method of the aircraft with the flight displays.

A flight management system (FMS) of an aircraft may, among other things, provide one or more displays on a flight display of the aircraft for a pilot. The FMS may typically generate or retrieve a flight plan for an aircraft, determine one or more parameters for operating the aircraft, and control or provide output for one or more aircraft subsystems, among other things.

SUMMARY

In one aspect, the inventive concepts disclosed herein are directed to a flight management system. The flight management system includes a display and at least one processor with a non-transitory processor-readable medium storing processor-executable code. The display is configured to display a user interface. The processor executable code causes the at least one processor to receive flight plan information regarding a flight plan of an aircraft. The processor-executable code further causes the at least one processor to receive aircraft status information from an aircraft monitoring system. The processor-executable code further causes the at least one processor to generate an alert indicating a deviation from the flight plan based on a comparison of the aircraft status information to the flight plan information. The processor-executable code further causes the at least one processor to provide the alert on a portion of the user interface displaying information indicative of the aircraft status information. The alert provides one or more user interface controls configured to enable a pilot to interact with the portion of the user interface displaying the information indicative of the aircraft status information to at least one of view additional information regarding the difference between the status information and the flight plan information and modify the flight plan of the aircraft.

In a further aspect, the inventive concepts disclosed herein are directed to a method for integrating a flight plan of an aircraft with an alerting system of an aircraft. The method includes receiving flight plan information regarding a flight plan of an aircraft. The method further includes receiving aircraft status information from an aircraft monitoring system. The method further includes generating an alert indicating a deviation from the flight plan based on a comparison of the aircraft status information to the flight plan information. The method further includes providing the alert on a portion of the user interface displaying information indicative of the aircraft status information. The alert provides one or more user interface controls configured to enable a pilot to interact with the portion of the user interface displaying the information indicative of the aircraft status information to at least one of view additional information regarding the difference between the status information and the flight plan information and modify the flight plan of the aircraft.

In a further aspect, the inventive concepts disclosed herein are directed to a flight management system. The flight management system includes a flight plan system configured to generate a flight plan for an aircraft, the flight plan including a plurality of aircraft parameters for a plurality of flight segments. The flight management system further includes an alerting system configured to detect one or more conditions relating to the aircraft and aircraft operation. The flight management system further includes a display system configured to provide a user interface for a flight display of the aircraft, the user interface including multiple portions, each portion relating to a particular aspect of the aircraft operation. The flight management system further includes at least one processor with a non-transitory processor-readable medium storing processor-executable code. The processor-executable code causes the at least one processor to receive flight plan information regarding a flight plan of an aircraft. The processor-executable code further causes the at least one processor to receive aircraft status information from an aircraft monitoring system. The processor-executable code further causes the at least one processor to generate an alert indicating a deviation from the flight plan based on a comparison of the aircraft status information to the flight plan information. The processor-executable code further causes the at least one processor to provide the alert on a portion of the user interface displaying information indicative of the aircraft status information. The alert provides one or more user interface controls configured to enable a pilot to interact with the portion of the user interface displaying the information indicative of the aircraft status information to at least one of view additional information regarding the difference between the status information and the flight plan information and modify the flight plan of the aircraft.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings:

FIG. 6 is an example display that may be presented to a pilot illustrating a navigation system-based notification, according to the inventive concepts disclosed herein;

DETAILED DESCRIPTION

Figure 1:
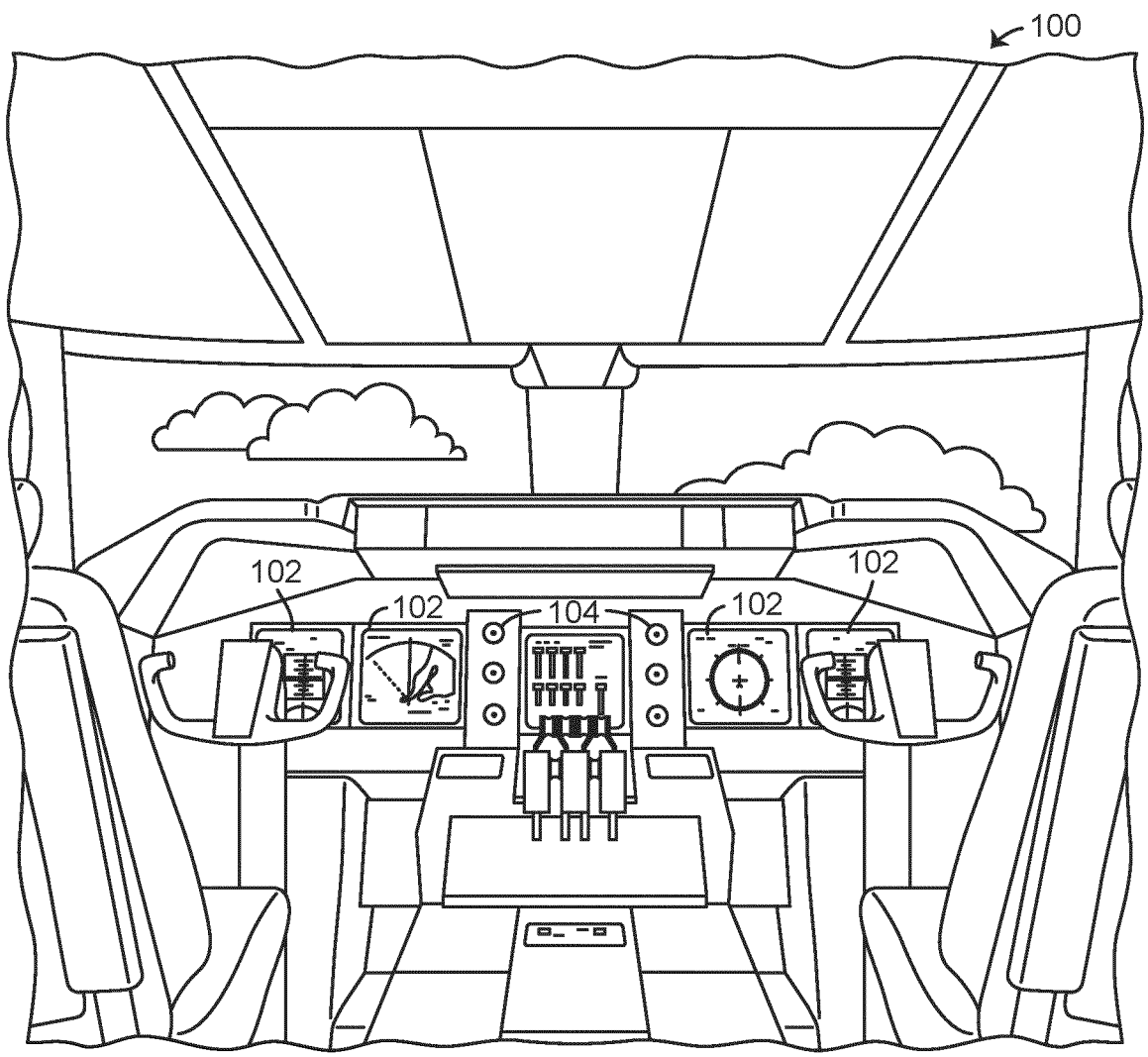
FIG. 1 is a schematic illustration of a control center of an aircraft including a display, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to integration of a flight plan system of the aircraft and an alarm system of the aircraft. A flight display of an aircraft, during a flight, may illustrate the flight plan of the aircraft, along with various parameters related to the flight plan (e.g., the current speed and altitude of the aircraft, weather conditions, distance to the target destination or to the next segment of the flight plan). The systems and methods described herein allow for the display of alert or warning-related information on the flight display, allowing a pilot to view the alert or warning without changing the other information displayed in the flight display. In other words, the systems and methods herein allow for integration between a flight plan system and an alerting system of the aircraft.

The systems and methods herein are used to improve pilot and crew awareness of an alert in the aircraft. An alert may generally relate to, for example, a procedure violation (e.g., deviating from a flight plan), equipment setup or malfunction, weather conditions, and the like. The systems and methods herein improve pilot awareness in detecting and responding to such situations. For example, the aircraft may be traveling too fast to properly execute an upcoming descent. The systems and methods herein may be used to first detect the situation, and then provide a visual indication of the situation to the pilot via the flight displays, allowing the pilot to properly respond to the situation without significantly impacting the content of the flight displays.

Referring to FIG. 1, a schematic illustration of an aircraft control center 100 is shown according to an embodiment of the inventive concepts disclosed herein. The aircraft control center 100 includes one or more flight displays 102 and one or more user interface (UI) elements 104. The flight displays 102 may be implemented using any of a variety of display technologies, including CRT, LCD, organic LED, dot matrix display, and others. The flight displays 102 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art. According to various exemplary embodiments of the inventive concepts disclosed herein, at least one of the flight displays 102 may be configured to provide a rendered display from the systems and methods described herein. For example, the flight displays 102 may be configured to generate a display for providing flight plan information for the current flight.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information. Graphical representations of the displayed information may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, allow an aircraft crew member to interact with various avionics applications and perform functions such as data entry, manipulation of navigational maps, and moving among and selecting checklist items. For example, the UI elements 104 may be used to adjust features of the flight displays 102, such as contrast, brightness, width, and length. The UI elements 104 may also (or alternatively) be used by an aircraft crew member to interface with or manipulate the displays of the flight displays 102. For example, the UI elements 104 may be used by an aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

Figure 2:
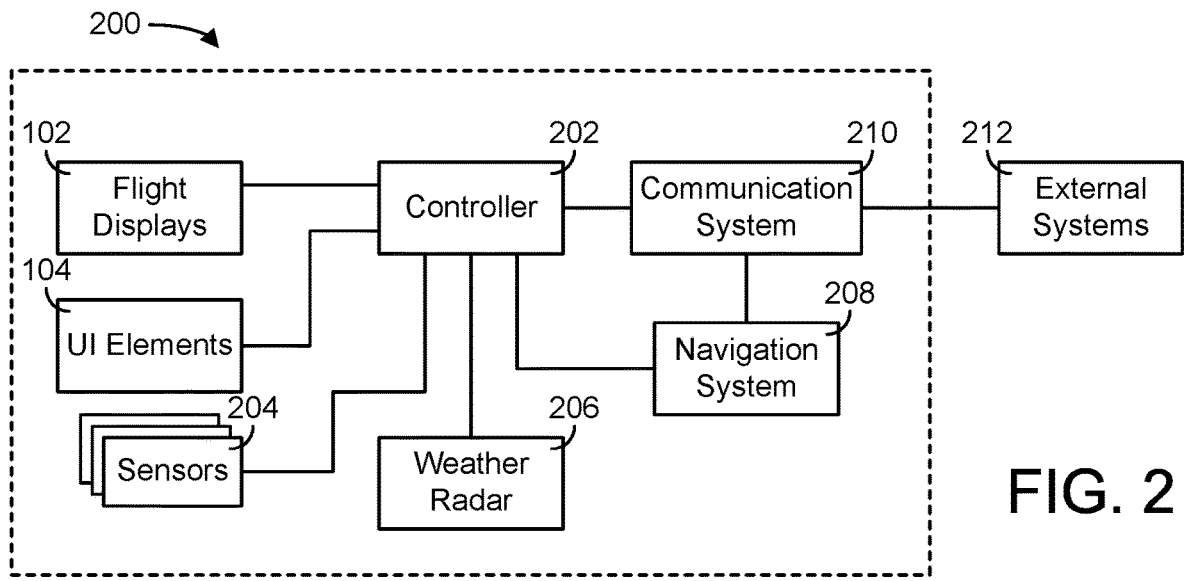
FIG. 2 is a block diagram of a flight management system, according to the inventive concepts disclosed herein.

Referring to FIG. 2, a block diagram of a flight management system 200 including a controller 202 is shown according to the inventive concepts disclosed herein. The flight management system 200 includes the controller 202, the flight displays 102 and UI elements 104, a plurality of sensors 204, a weather radar system 206, a navigation system 208, and a communication system 210. The flight management system 200 may include other systems and components for general aircraft operation.

The controller 202 is configured to send data to and receive data from, or otherwise facilitate electronic data communications, with the other systems of the flight management system 200 or with remote systems such as satellite-based systems or ground-based systems. The controller 202 may further interface with an aircraft control system, aircraft monitoring system, or other such system. The controller 202 may be configured to generally receive input from the various other systems and to update the flight displays 102 as described in the present disclosure. The activities of the controller 202 are shown in greater detail in FIG. 3. In various embodiments, the controller 202 may be configured to perform any of the actions described with any of the various other systems of the flight management system 200 as described herein.

The plurality of sensors 204 may include, for example, one or more fuel sensors, airspeed sensors, location tracking sensors (e.g., GPS), lightning sensors, turbulence sensors, pressure sensors, optical systems (e.g., camera system, infrared system), weather sensors, such as outside air temperature sensors, winds at altitude sensors, INS G load (in-situ turbulence) sensors, barometric pressure sensors, humidity sensors, or any other aircraft sensors or sensing system that may be used to monitor the performance of an aircraft or weather local to the aircraft. The plurality of sensors 204 may include one or more sensors configured to acquire air data indicative of at least one air characteristic (e.g., a pressure, an indicated airspeed, a true airspeed, an angle of attack, a pitch angle, an altitude, a temperature) of an environment surrounding the aircraft. The sensors may be located in various positions on the aircraft, and a single sensor may be configured to acquire more than one type of sensor data. Data from the sensors 204 may be used, for example, to determine one or more conditions that may cause an alert or warning to be generated.

The weather radar system 206 may be a system for detecting weather patterns. For example, the weather radar system 206 may detect wind patterns (e.g., a wind speed, a wind direction, forecasted winds, a magnetic heading, a cross-track, and the like), precipitation, and the like. The weather radar system 206 may further detect other weather conditions (e.g., temperature, humidity) that may be used to determine whether an alert or warning should be generated for the current weather conditions.

The navigation system 208 may be or include at least one of a GPS, a Global Navigation Satellite System (GNSS), an altitude heading and reference system (AHRS), an inertial reference system (IRS), and at least one navigation sensor (e.g., VOR, LOC, ADF/NDB, and DME radios). The navigation system 208 is configured to acquire flight data indicative of at least one flight characteristic of the aircraft. The flight characteristics may include, for example, a ground speed, a vertical speed, a pitch angle, or an altitude of the aircraft. Data from the navigation system 208 is output to the controller 202.

The communication system 210 facilitates communications between the controller 202 and one or more external systems 212 (e.g., a satellite system, other aircraft, a terrestrial station, or other air, space, or ground-based system). The communication system 210 may communicate with an external system 212 using any type of communication protocol or network (e.g., via a mobile network, via one or more bi-directional or uni-directional communication channels) and may include any type of wired or wireless interface for facilitating the communication. It should be understood that the information received by the controller 202 as described in the present disclosure may come from any internal or external source.

Figure 3:
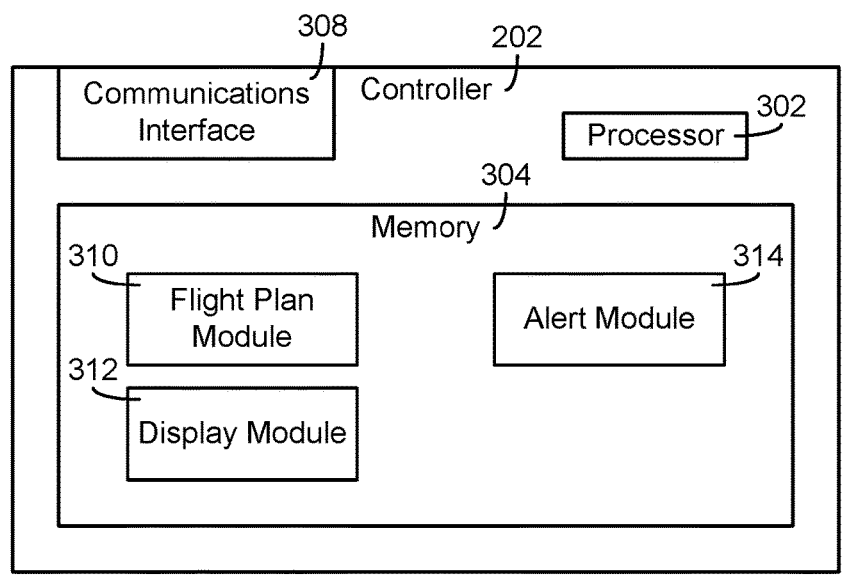
FIG. 3 is a detailed block diagram of the controller of the flight management system of FIG. 2, according to the inventive concepts disclosed herein.

Referring now to FIG. 3, the activities of the controller 202 are shown in greater detail according to the inventive concepts disclosed herein. As described above, the controller 202 integrates alerting features and flight display features of the flight management system 200. The controller 202 may further be responsible for other general aircraft-related functionality beyond the scope of the present disclosure, which are not shown in FIG. 3 for the sake of simplicity.

The controller 202 generally includes a processor 302 and memory 304. The processor 302 may be implemented as a specific purpose processor, an application specific integrated circuit (ASIC), one or more field programmable gate arrays (FPGAs), a group of processing components, or other suitable electronic processing components. The memory 304 is one or more devices (e.g., RAM, ROM, flash memory, hard disk storage) for storing data and computer code for completing and facilitating the various user or client processes, layers, and modules described in the present disclosure. The memory 304 may be or include volatile memory or non-volatile memory and may include database components, object code components, script components, or any other type of information structure for supporting the various activities and information structures of the inventive concepts disclosed herein. The memory 304 is communicably connected to the processor 302 and includes computer code or instruction modules for executing one or more processes described herein. The controller 202 further includes a communications interface 308 configured to facilitate communications between the controller 202 and the other aircraft systems. It should be understood that in alternative embodiments, the activities of one or more modules shown in the memory 304 may be executed at other aircraft systems and provided to the controller 202, or vice versa.

The memory 304 includes a flight plan module 310 configured to generate a flight plan for the aircraft. In some embodiments, the flight plan module 310 receives a flight plan via a datalink. In some embodiments, the flight plan module 310 receives a flight plan inputted or selected by an aircraft crew member. For example, an aircraft crew member may be enabled to select a flight plan from a flight plan database or a flight chart database that are periodically updated. The flight plan may generally include the takeoff location, the destination, and a path along which the aircraft should travel during the flight. The flight plan may further identify various parameters, such as an altitude of the aircraft along the path, a takeoff speed and angle, a descent speed and angle, and the like. The flight plan may identify multiple segments, each segment with different flight parameters (e.g., aircraft altitude, speed). The flight plan may account for weather, terrain, and other objects and conditions that may impact the aircraft performance. The flight plan module 310 may be configured to receive, via the communications interface 308, some or all of the flight plan information, and may be responsible for generating at least part or the entire flight plan, in various embodiments.

The memory 304 includes a display module 312 for generating an output for one or more of the flight displays 102. The display module 312 may generate a display such as those shown in FIGS. 4-7, for example. The displays may include flight information, such as the current status of the aircraft and the flight plan. The display module 312 may be configured to format the flight displays in any way. For example, the flight display may be divided into two or more sections, each section dedicated to a particular view or set of parameters. One section of a flight display may show, for example, the flight plan of the aircraft, along with the current location of the aircraft with respect to the flight plan. A second section may show altitude information, illustrating the aircraft position with respect to the ground and terrain. Another section may show aircraft status information, such as the current speed of the aircraft, weather conditions, and the like. It should be understood that the flight displays may vary in various embodiments and the present disclosure is not limiting to any particular type of flight display.

In one embodiment, some or all of the flight displays may be touchscreens. In such an embodiment, the display module 312 may format the output to allow a user to provide a touch input to the controller 202 via the touchscreen.

In some embodiments, the flight displays may include one or more charts, graphs, or other similar visual indicia. As one example, one section of the flight display may provide a profile view of the aircraft's position relative to the ground or terrain. The section may display altitude information in graphical form (e.g., illustrating a desired altitude of the aircraft for the current segment of the flight plan and future segments of the flight plan). As another example, one section of the flight display may chart the current position of the aircraft with respect to the desired flight plan of the aircraft. Other sections may display, for example, a runway status (e.g., status of the runway the aircraft is to take off from or land on), the current speed of the aircraft and other speed-related information, an active descent profile (for an aircraft preparing to descend), and the like.

The displays may be formatted in an object-oriented format. In other words, each element within the display may be treated as a single object that can be modified by the display module 312. For example, for a chart display, each label, value, bar, line, etc., may be treated as an individual element that can be modified by the display module 312.

The memory 304 includes an alert module 314 configured to detect a condition that may impact the aircraft. The alert module 314, in one embodiment, may receive flight plan information from the flight plan module 310, and use the flight plan information (along with sensor data and navigation information) to determine if an alert should be generated. As one example, the alert module 314, using the navigation system 208 and the flight plan, may determine if the aircraft has deviated from the flight plan. As another example, the alert module 314, using sensors 204, may determine if the aircraft is traveling too fast. As another example, the alert module 314, using sensors 204 and more particularly an altimeter, may determine if the aircraft is at a wrong altitude. As another example, the alert module 314 may be configured to check that the navigation sensor tuning or communication radio tuning is incorrect and in response provide an alert via the alerting system (e.g., via a flight display). The alert module 314 may further check the status of one or more aircraft subsystems (e.g., checking if the navigation system 208 is offline), may check the status of a runway the aircraft will depart from or land on (e.g., if the aircraft is oriented correctly, if the aircraft is targeting the correct runway), and the like. While the present disclosure provides various examples of alarms, it should be understood that the systems and methods herein may be implemented for any type of alarm.

The display module 312 may receive an indication of an alert from the alert module 314 and generate an update for the flight displays of the aircraft. Instead of merely generating a new display with relevant information for the pilot, the alarm information may be presented to the pilot within the current flight display. As described above, the flight display may be an object-oriented display where the display module 312 can change the display of various elements (e.g., text, icons, pictures, arrows, lines) without impacting the overall display configuration. The display module 312 may display the alert by identifying one or more elements in the display that correspond with the alert. For example, for an alert based on the current altitude of the aircraft, the display module 312 may identify the one or more elements that identify the current altitude of the aircraft (e.g., a text field that shows the current altitude, a portion of a chart that shows the position of the aircraft relative to ground). As another example, for an alert based on incorrect navigation sensor turning or communication radio tuning, the display module 312 may identify the one or more elements that identify the current navigation sensor tuning or communication radio tuning (e.g., by highlighting the incorrect information on the display).

In various embodiments, the one or more elements may or may not be interactive. For example, particularly if the flight display is a touchscreen, an element may be interactive, allowing a pilot to select the element and to provide an input to the controller 202 relating to the element. The pilot may select an element in order to change the value of the element or to provide an instruction to the controller 202 to modify the operation of an aircraft system in order to change the value of the element. For example, selecting an element displaying the speed of the aircraft may allow the pilot to enter a new target speed or to provide a command to the controller 202 to reduce the speed. In some embodiments, the elements may not be interactive but the pilot may interact with the controller 202 in other ways in response to the element being highlighted based on an alert.

Referring now generally to FIGS. 4-7, example flight displays are shown for situations in which an alert has been generated. In the flight displays of FIGS. 4-7, various methods of featuring the alert on the flight display without disrupting the overall flight display are shown. It should be understood that the example flight displays shown are not limiting and that the systems and methods herein are applicable for any type of alert and flight display.

Figure 4:
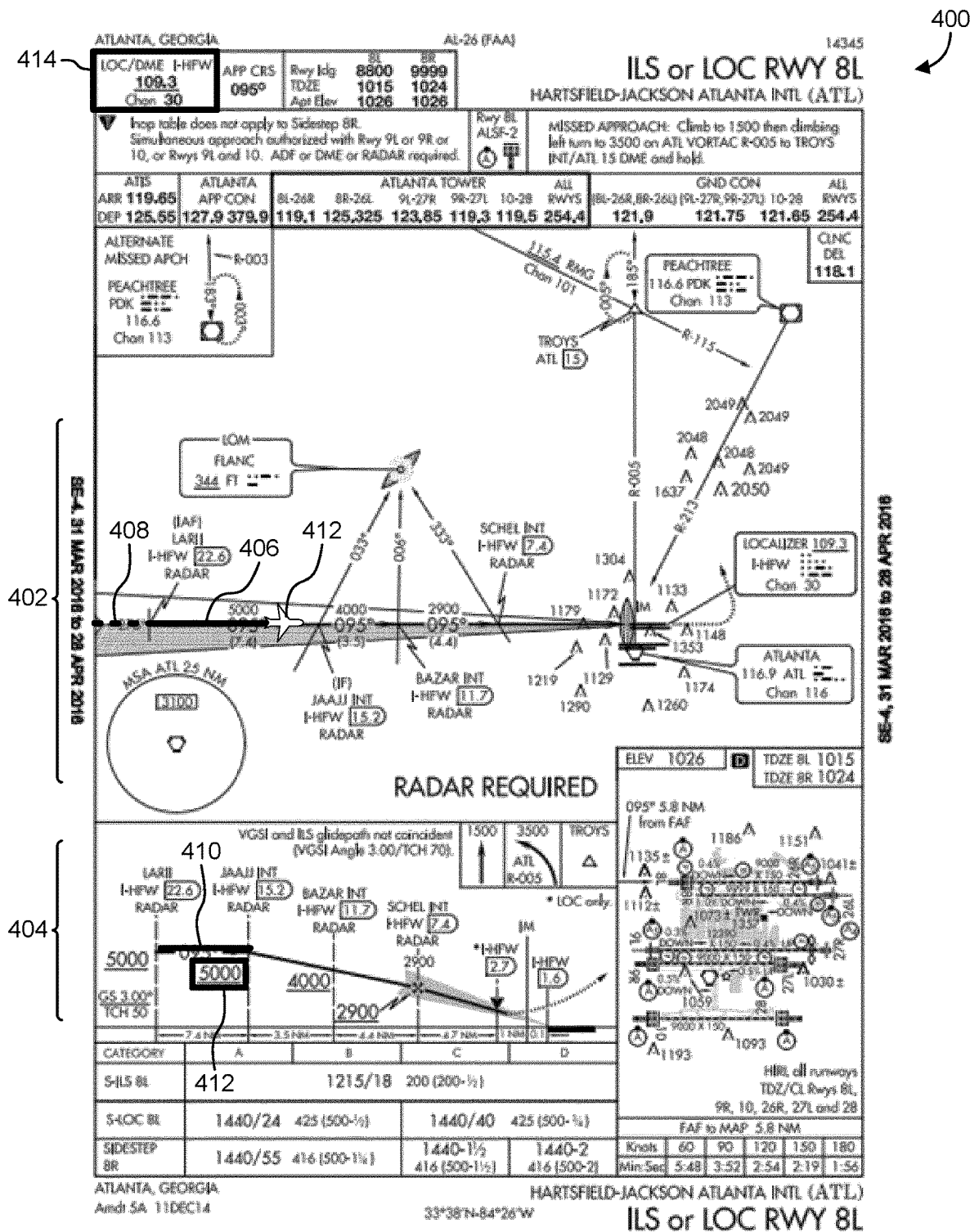
FIG. 4 is an example display that may be presented to a pilot illustrating a location-based notification, according to the inventive concepts disclosed herein.

Referring to FIG. 4, an example user interface 400 that may be presented on the flight displays 102 is illustrated. The user interface 400 is a two-dimensional top-down view that includes a lateral profile section 402 and a vertical profile section 404. The lateral profile and vertical profile illustrate flight plan information for the aircraft (e.g., a length of each segment of the flight plan, a desired elevation for each segment, ascension or descend rates and angles).

As described above, individual elements on the user interface 400 may be modified to highlight the element. For example, as shown in FIG. 4, a segment 406 of a flight plan is modified to highlight a segment for the pilot (e.g., an upcoming segment of the flight plan, o a current segment of the flight plan). The modification may include, for example, changing the color of the element (e.g., to a brighter color). The modification may further or alternatively include changing a line weight, font, border, or any other aspect of the element. In FIG. 4, the modification is shown as a bolded line for the sake of clarity; the example of a bolded line is not limiting. The modification of the segment allows the pilot to more clearly identify his or her location and position relative to the flight plan. Another user interface element (segment 408) may also be highlighted, in a different manner (shown as a dashed line in FIG. 4 for illustrative purposes). This modification may represent a previous or current segment of the flight plan that may also be of interest to the pilot. Further, an element 410 illustrating the current altitude of the aircraft is shown as highlighted (via a border; other methods of highlighting the element may be used).

The modification of the flight plan segment display is used to more clearly identify an area of interest to the pilot that otherwise would not be immediately distinguishable to the pilot. For example, without the modification, it may be difficult for the pilot to immediately determine the current status and location of the aircraft compared to the overall flight plan. In some embodiments, an icon 412 may further be added to the user interface, to show the current location of the aircraft (shown as an aircraft icon in FIG. 4).

In the example of FIG. 4, assume that a location-based alert has been generated by the alert module 314. The location-based alert may identify that the aircraft has deviated from the flight path and should correct course. Instead of presenting a new user interface or new user interface element, the user interface 400 may highlight an existing element 414, shown as a box. The element 414 is shown to include tuning localizer tuning information (e.g., information that can be used to more precisely determine a location of the aircraft). The element 414 is highlighted, upon which the pilot can select the box (e.g., via touching a touchscreen, or via another user interface control). Upon selection of the box, the aircraft can auto-correct, or the pilot may provide further input to cause the aircraft to correct course.

Figure 5:
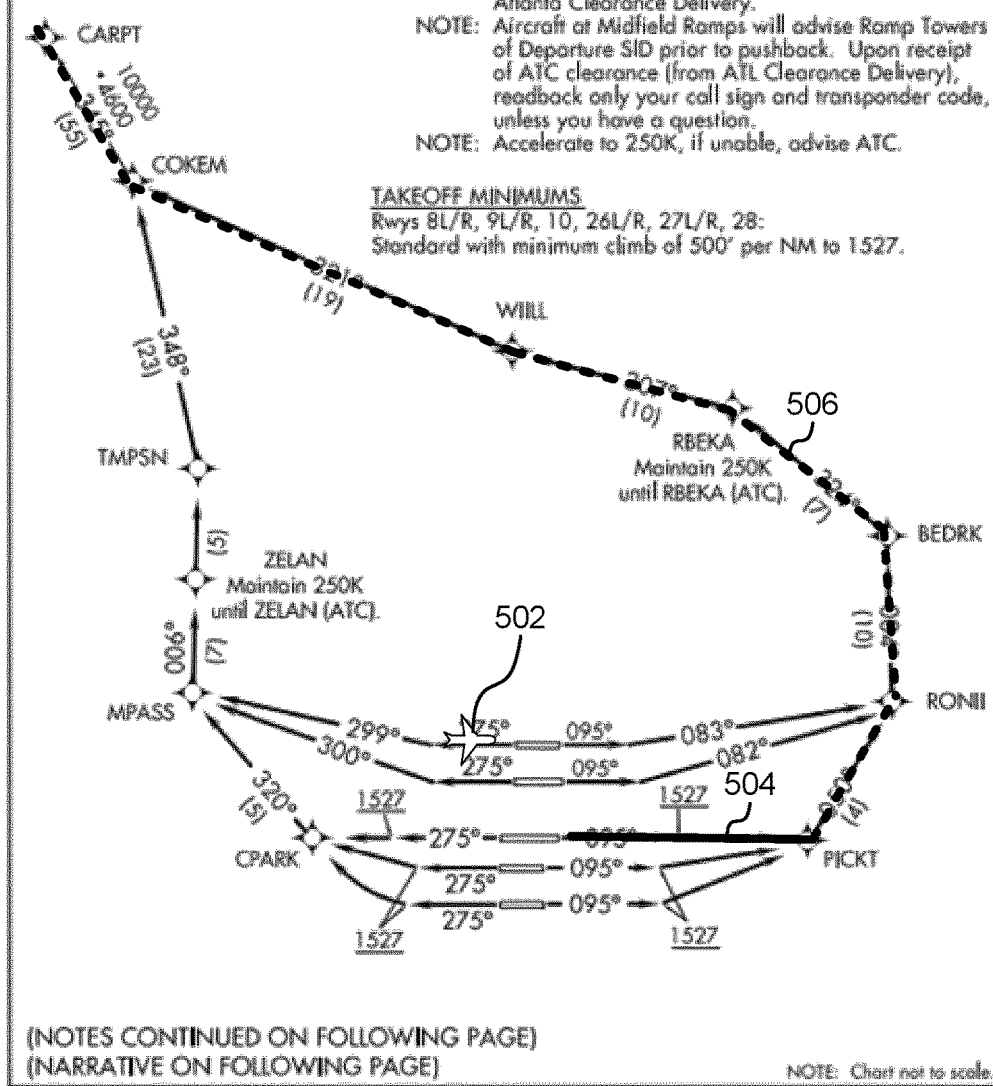
FIG. 5 is an example display that may be presented to a pilot illustrating a runway-based notification, according to the inventive concepts disclosed herein.

Referring to FIG. 5, another example user interface 500 that may be presented on the flight displays 102 is illustrated. In the example of FIG. 5, the aircraft and pilot are preparing for takeoff and the user interface 500 is displaying a runway map, runway information, and takeoff information. As shown in FIG. 5, multiple runways are shown; the runways may be identified by displaying the overall map (showing each runway and its position in the airport, to scale), or may be identified via an object identifier (e.g., a name) listed on the display.

An icon 502 is shown on the user interface 500, showing the current location of the aircraft. A next segment 504 is identified on the user interface 500 that identifies a next section of the runway the aircraft should traverse, while further segments 506 are illustrated that show the path the aircraft should take to take off.

A navigation or location system of the aircraft may link the position of the aircraft to the runway the aircraft currently occupies. The user interface 500 may then present a cursor or pointer at the aircraft location, allowing a user to select the runway. For example, in the example of FIG. 5, the aircraft is shown on a different runway than the runway identified as part of the takeoff process. The alert module 314, using the navigation system to locate the position of the aircraft, may cause the generation of the cursor at the current aircraft location. The pilot can then change the runway the aircraft should use from the one highlighted to the one the aircraft currently occupies. Alternatively, the pilot may correct course to head for the highlighted runway. The selection of the new runway, or a route to traverse to the highlighted runway, is accomplished on the user interface 500 without the need for loading a new screen. In some embodiments, the alert module 314, using the navigation system to determine navigation or communication radio tuning, may cause the generation of a cursor on the chart in the location where charted tuning information is displayed.

Figure 6:
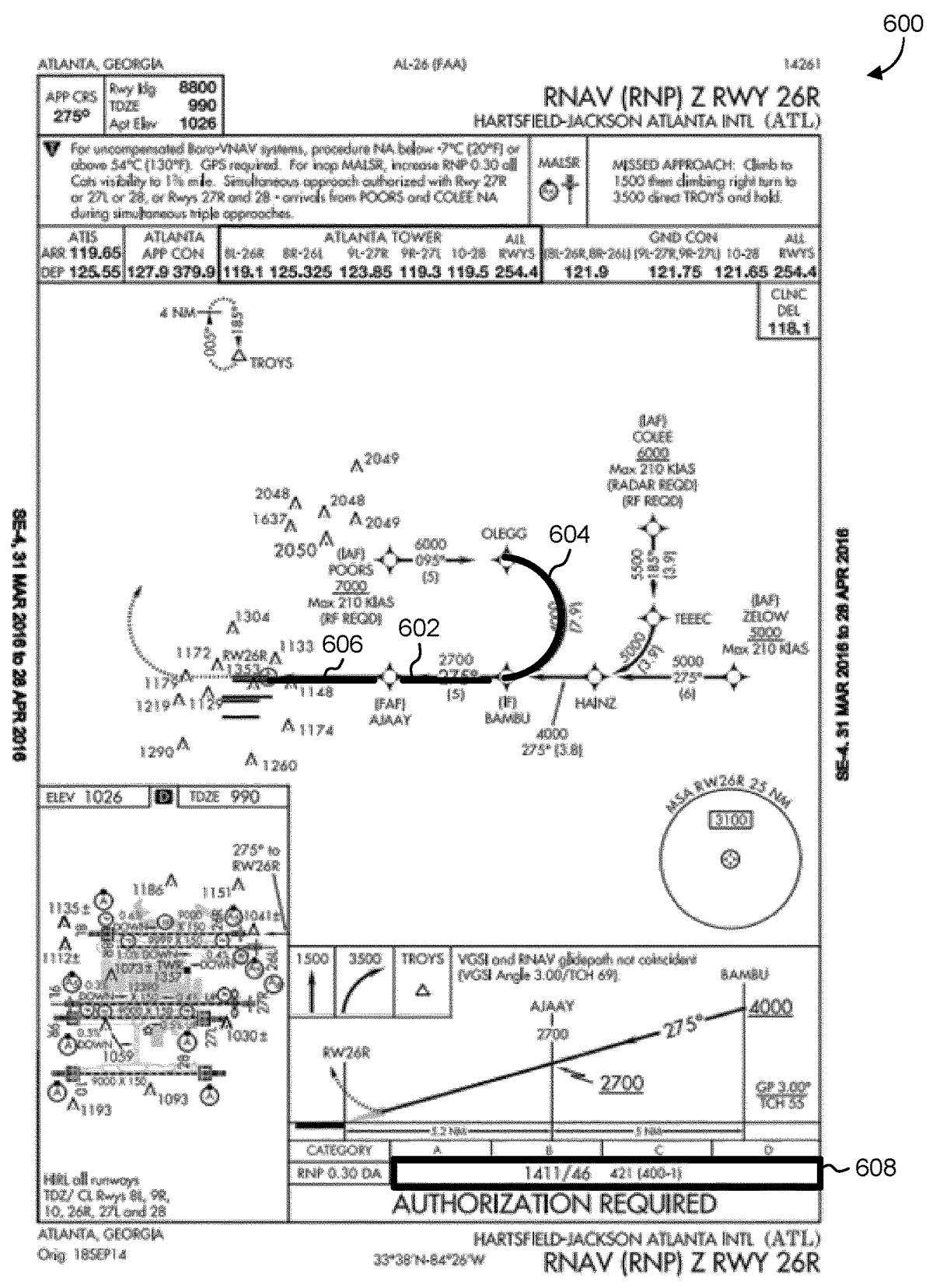

Referring to FIG. 6, another example user interface 600 that may be presented on the flight displays 102 is illustrated. The current segment 602 of the flight path, previous segment of 604 of the flight path, and future segment 606 of the flight path are shown highlighted. In the example of FIG. 6, the alert module 314 has detected a navigation system failure (e.g., a GPS failure). As a result, the future segment 606 is highlighted as a segment of the flight path where there may be navigation-related issues as a result of the failure. The aircraft is somewhere in the current segment 602, but its exact position is unknown because of the failure. The highlighting of the future segment allows the pilot to select a different route before reaching the problem area, and to generally make decisions to limit the impact of the navigation system failure. A portion of the user interface 600 may further be highlighted (shown by box 608) which may show more specific navigation system information for the pilot.

Figure 7:
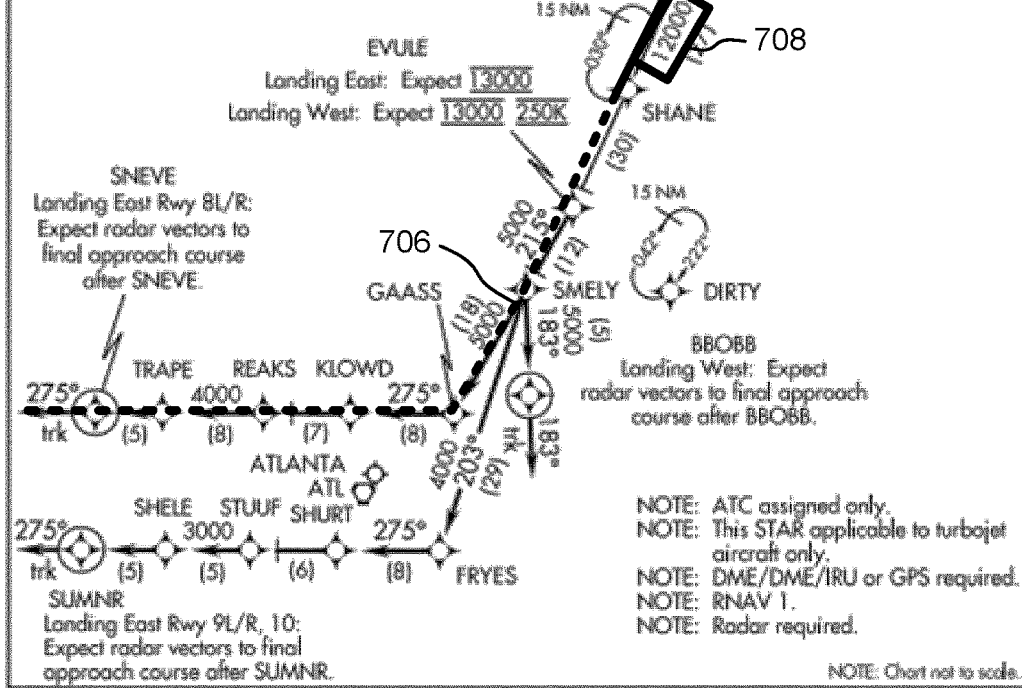
FIG. 7 is an example display that may be presented to a pilot illustrating an altitude-based notification, according to the inventive concepts disclosed herein.

Referring to FIG. 7, another example user interface 700 that may be presented on the flight displays 102 is illustrated. The current segment 702 of the flight path, previous segment of 704 of the flight path, and future segments 706 of the flight path are shown highlighted. In the example of FIG. 7, the alert module 314 has detected that the aircraft is at the wrong altitude. The alert module 314 may generate the alert when the aircraft is above a threshold altitude, below a threshold altitude, or not exactly at the desired altitude.

Figure 8:
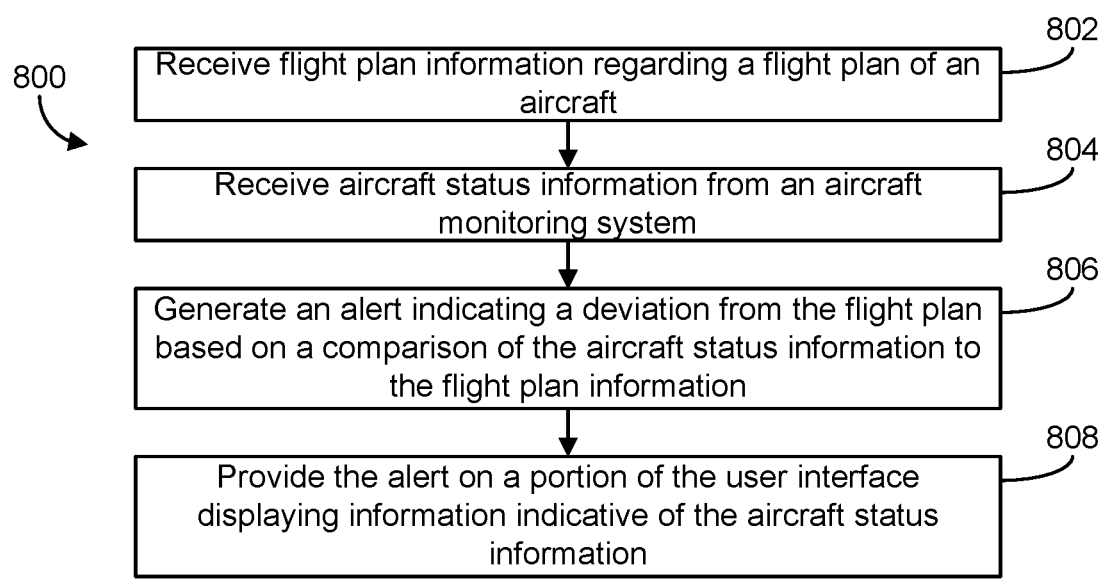
FIG. 8 is a flow diagram of a method for presenting an alert on a flight display of an aircraft, according to the inventive concepts disclosed herein.

Referring now to FIG. 8, a flow diagram of a method 800 for presenting an alert on a flight display of an aircraft is shown according to the inventive concepts disclosed herein. The method 800 may be executable by, for example, the flight management system 200 and more particularly the controller 202 as described above.

At step 802, the method 800 includes receiving flight plan information regarding a flight plan of an aircraft. At step 804, the method includes receiving aircraft status information from an aircraft monitoring system. Steps 802 and 804 may generally include receiving detailed flight plan information (e.g., a number of segments of the flight plan and one or more aircraft parameters to maintain for each segment) and detailed aircraft information (e.g., from one or more sensors of the aircraft).

At step 806, the method 800 further includes generating an alert indicating a deviation from the flight plan based on a comparison of the aircraft status information to the flight plan information. At step 808, the method 800 further includes providing the alert on a portion of the user interface displaying information indicative of the aircraft status information. In one embodiment, the alert is a navigation-related alert identifying a deviation during an active segment of the flight plan. In another embodiment, the alert is a speed-related alert identifying that the aircraft is traveling too fast to follow the flight plan of the aircraft. In another embodiment, the alert is an altitude-related alert identifying that the aircraft is not at an altitude specified by the flight plan of the aircraft. In another embodiment, the alert is a runway-related alert identifying that the aircraft is in an incorrect position for landing at or departing from a runway. In another embodiment, the alert is generated based on a navigation system failure check that determines a failure of a navigation system of the aircraft.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A flight management system comprising:
   at least one processor with a non-transitory processor-readable medium storing processor-executable code for causing the at least one processor to:
   receive flight plan information based on a flight plan of an aircraft;
   receive aircraft status information from an aircraft monitoring system;
   determine a deviation from the flight plan based on a comparison of the aircraft status information with the flight plan information; and
   provide an alert based on the deviation by emphasizing an interactive element displayed on a user interface of a display, the interactive element associated with the aircraft status information and configured to be selected by a user to at least one of display additional information regarding the alert and to change a control parameter of the aircraft, wherein changing the control parameter changes the aircraft status information.

2. The system of claim 1, wherein the user interface includes a first portion and a second portion, the alert and a corresponding user interface control provided in the first portion of the user interface, and wherein the first portion and the second portion of the user interface do not overlap.

3. The system of claim 2, wherein the user interface at least partially comprises a top-down view of the aircraft and surrounding area, and a vertical profile of the aircraft and surrounding area.

4. The system of claim 1, wherein the alert comprises a pointer that highlights one or more particular fields or icons on the user interface.

5. The system of claim 1, wherein the alert comprises one of highlighting or changing the color of one or more fields or icons on the user interface.

6. The system of claim 1, wherein the flight plan is an initial flight plan, wherein the comparison of the aircraft status information with the flight plan information comprises comparing a current flight plan and a current location of the aircraft with the initial flight plan of the aircraft;
   wherein the alert is based on a deviation during an active segment of the flight plan; and
   wherein the alert highlights the active segment of the flight plan.

7. The system of claim 1, wherein the comparison of the aircraft status information with the flight plan information comprises comparing a current speed of the aircraft against a target speed;
   wherein the alert is based on the aircraft traveling at a speed different than a speed of the flight plan;
   wherein the alert highlights the current speed of the aircraft.

8. The system of claim 1, wherein the comparison of the aircraft status information to the flight plan information comprises comparing the current altitude with a desired altitude;
   wherein the alert is based on the aircraft deviating from an altitude specified by the flight plan;
   wherein the alert highlights the current altitude of the aircraft.

9. The system of claim 1, wherein the comparison of the aircraft status information with the flight plan information comprises comparing the orientation of the aircraft to an occupied runway that the aircraft occupies or a target runway;
   wherein the alert is based on the aircraft being in an incorrect position for departing from the occupied runway or landing at the target runway;
   wherein the alert highlights the current position of the aircraft and the occupied runway or the target runway.

10. The system of claim 1, wherein the alert is based on a navigation system failure check that indicates a failure or incorrect configuration of a navigation system of the aircraft, wherein the incorrect configuration comprises an incorrect navigation or communication radio tuning.

11. The system of claim 1, wherein the display comprises a flight display that is at least partially a touchscreen, and wherein the interactive element enables a provision of an input via the touchscreen.

12. A method for integrating a flight plan of an aircraft with an alerting system of an aircraft, the method comprising:
    receiving flight plan information based on a flight plan of an aircraft;
    receiving aircraft status information from an aircraft monitoring system;
    determining a deviation from the flight plan based on a comparison of the aircraft status information with the flight plan information; and
    providing an alert based on the deviation by emphasizing an interactive element displayed on a user interface of a display, the interactive element associated with the aircraft status information and configured to be selected to at least one of display additional information regarding the alert and to change a control parameter of the aircraft, wherein changing the control parameter causes the aircraft status information to change.

13. The method of claim 12, wherein the alert is provided in a portion of the user interface that does not impact the display of other portions of the user interface.

14. The method of claim 12, wherein the user interface at least partially comprises a top-down view of the aircraft and surrounding area, and a vertical profile of the aircraft and surrounding area.

15. The method of claim 12, wherein the alert comprises a pointer that highlights one or more particular fields or icons on the user interface.

16. The method of claim 12, wherein the alert comprises one of highlighting or changing the color of one or more fields or icons on the user interface.

17. The method of claim 12, wherein the alert is based on one of:
    comparing a current flight plan and a current location of the aircraft with the flight plan of the aircraft;
    comparing a current speed of the aircraft with a target speed;
    comparing a current altitude of the aircraft against at least one of a desired altitude and a setting of an altitude alerter;
    comparing an orientation of the aircraft with a current runway of the aircraft or a target runway of the aircraft; and
    a navigation system failure check that indicates a failure or misconfiguration of a navigation system of the aircraft, wherein the misconfiguration comprises a misconfigured navigation or communication radio tuning.

18. A flight management system comprising:
    at least one processor with a non-transitory processor-readable medium storing processor-executable code for causing the at least one processor to:
        receive flight plan information based on a flight plan of the aircraft;
        receive aircraft status information from an aircraft monitoring system;
        compare the aircraft status information with the flight plan information; and
        provide an alert based on the comparison by emphasizing an interactive element displayed on a user interface of a display, the interactive element associated with the aircraft status information and configured to be selected to at least one of display additional information regarding the comparison and to change a control parameter of the aircraft, wherein changing the control parameter causes the aircraft status information to change.

19. The system of claim 18, wherein the alert is based on one of:
    comparing a current flight plan and a current location of the aircraft with the flight plan of the aircraft;
    comparing a current speed of the aircraft with a target speed;
    comparing a current altitude of the aircraft with at least one of a desired altitude and a setting of an altitude alerter;
    comparing an orientation of the aircraft with a current runway of the aircraft or a targeted runway of the aircraft; and
    a navigation system failure check that indicates a failure or incorrect configuration of a navigation system of the aircraft.

20. The system of claim 18, wherein the user interface includes a plurality of interactive elements, each interactive element being modifiable by the display system based on a type of the alert.

* * * * *